United States Patent
Merz

(10) Patent No.: US 8,113,751 B2
(45) Date of Patent: Feb. 14, 2012

(54) LOCKING DEVICE FOR FASTENING A CONTAINER

(75) Inventor: Ludger Merz, Hamburg (DE)

(73) Assignee: Airbus Deutschland GmbH (DE)

( * ) Notice: Subject to any disclaimer, the term of this patent is extended or adjusted under 35 U.S.C. 154(b) by 364 days.

(21) Appl. No.: 12/086,957

(22) PCT Filed: Dec. 21, 2006

(86) PCT No.: PCT/EP2006/012391
§ 371 (c)(1),
(2), (4) Date: Oct. 27, 2009

(87) PCT Pub. No.: WO2007/071419
PCT Pub. Date: Jun. 28, 2007

(65) Prior Publication Data
US 2010/0040427 A1 Feb. 18, 2010

Related U.S. Application Data

(60) Provisional application No. 60/753,906, filed on Dec. 23, 2005.

(30) Foreign Application Priority Data

Dec. 23, 2005 (DE) .......................... 10 2005 061 957

(51) Int. Cl.
*B64D 9/00* (2006.01)
*B64C 1/20* (2006.01)
(52) U.S. Cl. ....................................................... 410/77
(58) Field of Classification Search .................. 410/77, 410/128; 244/118.1, 118.2, 137.1
See application file for complete search history.

(56) References Cited

U.S. PATENT DOCUMENTS

| | | | |
|---|---|---|---|
| 2,540,207 A * | 2/1951 | Mangels | 410/121 |
| 3,262,588 A | 7/1966 | Davidson | |
| 3,693,920 A | 9/1972 | Trautman | |
| 3,741,508 A | 6/1973 | Alberti | |
| 3,788,498 A * | 1/1974 | Slusher | 206/591 |
| 3,933,101 A | 1/1976 | Blas | |
| 4,230,044 A | 10/1980 | Rohrig | |
| 4,457,649 A | 7/1984 | Vogg et al. | |

(Continued)

FOREIGN PATENT DOCUMENTS

AN 7217164 6/1974

(Continued)

OTHER PUBLICATIONS

Office Action from Japanese Application No. 2008-546264, dated Nov. 15, 2011.

*Primary Examiner* — H Gutman
(74) *Attorney, Agent, or Firm* — Lerner, David, Littenberg, Krumholz & Mentlik, LLP

(57) ABSTRACT

A locking device for fastening containers for an aircraft. The locking device comprises at least one locking arrangement that can be affixed to an aircraft floor and that comprises a retaining element. The locking arrangement can be fastened to the aircraft floor such that a gap for adjusting the container is provided between the container and the locking arrangement. The retaining element of the locking arrangement can subsequently be moved in the direction of the payload such that a gap between the locking arrangement and the payload can be adjusted.

12 Claims, 5 Drawing Sheets

U.S. PATENT DOCUMENTS

| | | | |
|---|---|---|---|
| 5,346,161 A * | 9/1994 | Eilenstein-Wiegmann et al. | .......... 244/137.1 |
| 5,950,964 A | 9/1999 | Saggio et al. | |
| 5,957,640 A | 9/1999 | Schmieke et al. | |
| 6,099,220 A | 8/2000 | Poth | |
| 2004/0265085 A1 | 12/2004 | Mayer et al. | |

FOREIGN PATENT DOCUMENTS

| | | |
|---|---|---|
| DE | 296 17 130 U1 | 3/1997 |
| DE | 196 34 791 C1 | 12/1997 |
| EP | 0 063 521 A1 | 10/1982 |
| FR | 2 117 983 | 7/1972 |
| FR | 2 240 176 | 7/1975 |
| FR | 2 500 805 | 9/1982 |
| FR | 2 710 318 | 3/1995 |
| GB | 2 393 704 A | 4/2004 |
| JP | 53-9000 | 1/1978 |
| SU | 129737 | 11/1960 |
| SU | 656282 A2 | 10/1996 |
| WO | 2004/031033 A2 | 4/2004 |

\* cited by examiner

LOCKING DEVICE FOR FASTENING A CONTAINER

REFERENCE TO RELATED APPLICATIONS

This application claims the benefit of the filing date of German Patent Application No. 10 2005 061 957.6 filed Dec. 23, 2005 and of U.S. Provisional Patent Application No. 60/753,906 filed Dec. 23, 2005, the disclosures of which are hereby incorporated herein by reference.

FIELD OF THE INVENTION

The present invention relates to a locking device and a method for fastening a container for an aircraft, as well as to the use of a locking device for fastening a container, and to an aircraft.

BACKGROUND TO THE INVENTION

In aircrafts, very stringent requirements in relation to securing freight containers in aircraft loading spaces are existing. It must be ensured that the fastening means of the freight is sufficiently stable for the freight not to work itself loose due to aircraft movements, as this would result in damage to the aircraft structure.

Up to now, air cargo containers and pallets such as for example unit load devices (ULDs) have been affixed to aircraft cargo compartment floors with the use of bolts. This requires that for practical reasons during loading an additional gap between the ULD and the bolt has to be taken into account in the design. Within this play, a ULD can move freely during a flight, thus, depending on aircraft movements, said ULD time and again hits the locking devices at a particular speed v and acceleration a. These dynamic loads have to be taken up by the locking element and transferred to the aircraft structure.

Up to now the bolts and cargo compartment floors have been dimensioned purely statically without however taking into account the factor of play, i.e. the dynamic impact loads of the containers during flight manoeuvres. For this reason considerable safety is factored into the design calculations relating to the bolts so as to preclude any failure of these locking elements. The decisive factors affecting the extent of the dynamic loads are the impact velocities v that depend on the distance of the play and on the acceleration forces a, which act on the aircraft.

SUMMARY OF THE INVENTION

Amongst other things, it may be an object of the invention to provide an economical and weight-reduced locking device for containers.

This object is solved by a locking device and by a method for fastening containers, by an aircraft, and by the use of a locking device for fastening payloads in an aircraft, with the features according to the independent claims.

According to a first exemplary embodiment of the invention, a locking device for fastening containers for an aircraft is provided. In this arrangement the locking device comprises at least one locking arrangement with a retaining element. The at least one locking arrangement can be affixed to an aircraft floor. This at least one locking arrangement can be fastened to the aircraft floor such that a gap for adjusting the container is provided between the container and the at least one locking arrangement. The retaining element of the locking arrangement is adapted for moving in the direction of the payload such that a gap between the locking arrangement and the payload is adjustable.

According to an exemplary embodiment of the method, a method for fastening containers for an aircraft is provided. The method comprises the step of affixing a locking arrangement to an aircraft floor by a retaining element. The at least one locking arrangement is attached to the floor such that between the container and the at least one locking arrangement a gap for adjusting the container is provided.

According to a further exemplary embodiment of the invention, a locking device for fastening containers in an aircraft is used.

According to a further exemplary embodiment of the invention, an aircraft with a locking device for fastening containers is used.

With the locking device according to the invention it is possible to secure a container in an aircraft in two steps. In a first step the container is moved to a particular position, and by the locking arrangement according to the invention said container is held in a particular region. With the still existing gap between the locking arrangement and the container it is possible to adjust the container, for example a unit load device (ULD) or an air cargo container, into a desired position. By the retaining element of the locking arrangement, according to the invention, the gap between the locking arrangement and the container can be closed or reduced. With this locking device according to the invention the dynamic loads can be significantly reduced, because any play between the container and the locking device, and thus the impact velocity, can be significantly reduced or excluded. In this way the locking devices can also be designed so as to be lighter in weight and smaller, because the dynamic loading cases can be significantly lower due to the reduced play, with said dynamic loads having hardly any influence in the design calculations of the locking device. Furthermore, the loads acting on the aircraft structure, in particular on the aircraft floor, are reduced, so that in design calculations of the structure it is also possible to use a more light-weight design.

Extensive testing has shown that the dynamic load factors can significantly surpass the static load factors in importance. These dynamic impact loads are decisively determined by the rigidity and the weight of an empty ULD. The payload in the ULDs, which payload often amounts to many times the empty weight of the ULD, has a comparatively small influence on the dynamic load. Due to the reduction in the gap by the locking device according to the invention, the decisive dynamic load, which results because of the movements of the ULD, can be reduced, and in this way a lighter-weight design of the locking device and of the aircraft structure can be used. Furthermore, a gap for adjusting the container is provided nevertheless, so that no functional disadvantages arise from the locking device according to the invention.

According to a further exemplary embodiment of the invention, the retaining element comprises a threaded rod for adjusting the gap. This provides a simple design solution by which the gap can be reduced in a particular or defined position by way of turning in or turning out a threaded rod.

According to a further exemplary embodiment of the locking device, the retaining element comprises an eccentric detent element with engaging teeth and an engaging element. In this way the retaining element is designed such that the detent element can be inserted into the gap, and the position of the detent element can be fixed in that the engaging teeth of the detent element engage the engaging element. This embodiment of the locking device makes it possible to adjust the gap in a defined manner in that this eccentric detent element can be brought to a desired position and can be fixed.

In a further exemplary embodiment, the engaging element can comprise a foot lever for locking the detent element into place. This makes it possible to quickly and flexibly fasten a container in a cargo compartment. While the container is for example positioned and adjusted manually by an employee, the employee can arrest the container in the desired position by simple operation of a foot lever. This makes it possible to fasten and adjust the container in a convenient and extremely speedy manner.

According to an exemplary embodiment, the locking device further comprises a fastening rail with adjustment holes, which fastening rail is attached to the aircraft floor. The at least one locking arrangement can thus be adjustably affixed in a defined position along the guide rail so that a gap between the containers and the locking arrangement can be provided. In this way the locking arrangement can already be adjusted before the payload is moved into position.

According to a further exemplary embodiment of the invention, the locking device further comprises at least one damping element. This at least one damping element is affixed between the retaining element and the container in such a way that movements of the container can be damped. Especially in the case of non-damped fastening systems for containers, deformation or damage to the locking device or to the container frequently occurs, which deformation or damage can thus be prevented. Even in the case of small gaps damping is thus advantageous because otherwise large shock pulses caused by the impacting containers have to be taken up by the locking elements or by the aircraft floor.

According to a further exemplary embodiment, the locking device further comprises an inspection element, for example with electrical sensors. The inspection element is designed such that in the case of a malfunction of the locking device an indication signal can be generated. In this way any malfunction or damage to the locking device can be detected early, so that safety-relevant repairs or efforts can be made early. Thus the danger of an accident occurring in an aircraft loading space can be significantly reduced.

According to a further exemplary embodiment, the locking device comprises a plurality of locking arrangements with retaining elements. The plurality of locking arrangements enclose the container in such a way that a gap for adjusting the container is provided. The retaining elements of the plurality of locking arrangements can be moved in the direction of the container such that the gap between the plurality of locking arrangements and the container can be adjusted. With this exemplary embodiment of the invention it is possible to take up dynamic loads, which act on the containers as a result of various flight manoeuvres, by the locking device. Thus dynamic loads in all directions, for example along the longitudinal axis (x-axis) of the aircraft, or in an orthogonal direction in relation to it (y- or z-axis), can be reduced. For example in the case of rolling or yawing of the aircraft, frequently dynamic loads occur not only in the x-direction or longitudinal direction of the aircraft, but also orthogonally in the y-direction, so that for these too the locking devices, according to the invention, for fastening containers can be provided.

The embodiments of the locking device also relate to the method and to the aircraft as well as to the use, and vice-versa.

The locking device according to the invention and the method according to the invention thus provide an adjustable locking system by which the functions of adjustment and locking into place can be implemented in a simple design. Thus, for example, a container can first be brought to a determined position in an aircraft loading space, and subsequently it can be aligned and then locked into place.

BRIEF DESCRIPTION OF THE DRAWINGS

For further explanation and a better understanding of the present invention, exemplary embodiments are described below in more detail with reference to the enclosed drawings. In these drawings.

DETAILED DESCRIPTION OF EXEMPLARY EMBODIMENTS

Figure 1:
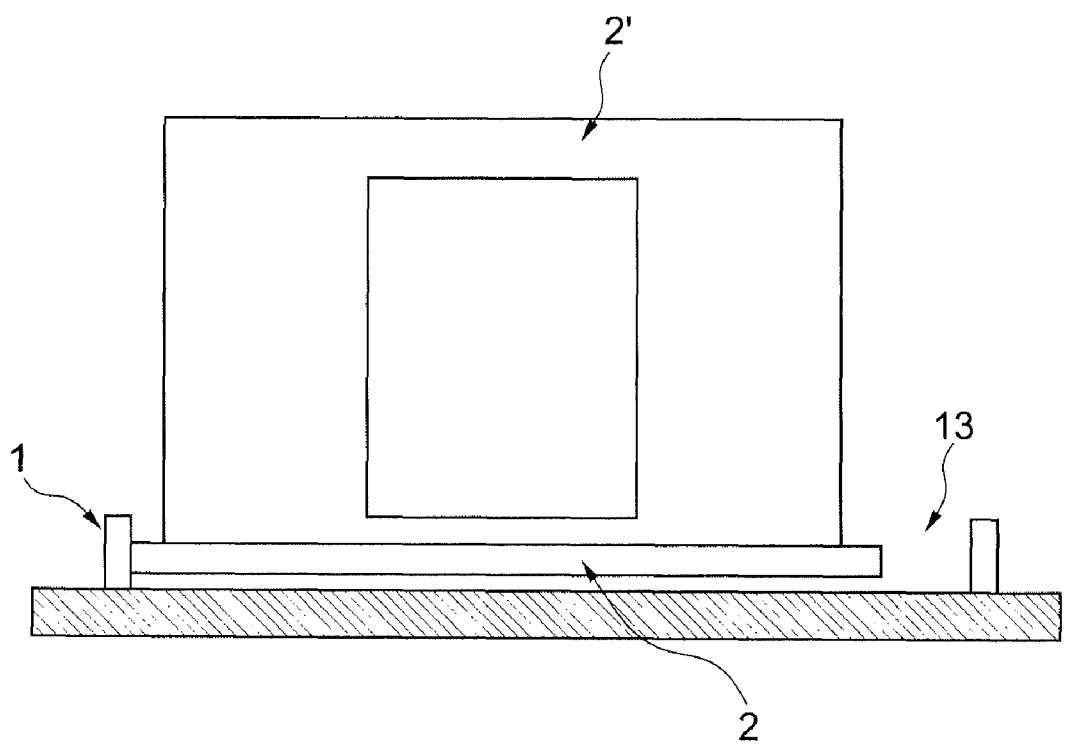
FIG. 1 shows a diagrammatic view of locking devices, as known from the state of the art.

Identical or similar components in the different figures have the same reference characters. The illustrations in the figures are diagrammatic and not to scale.

Figure 2:
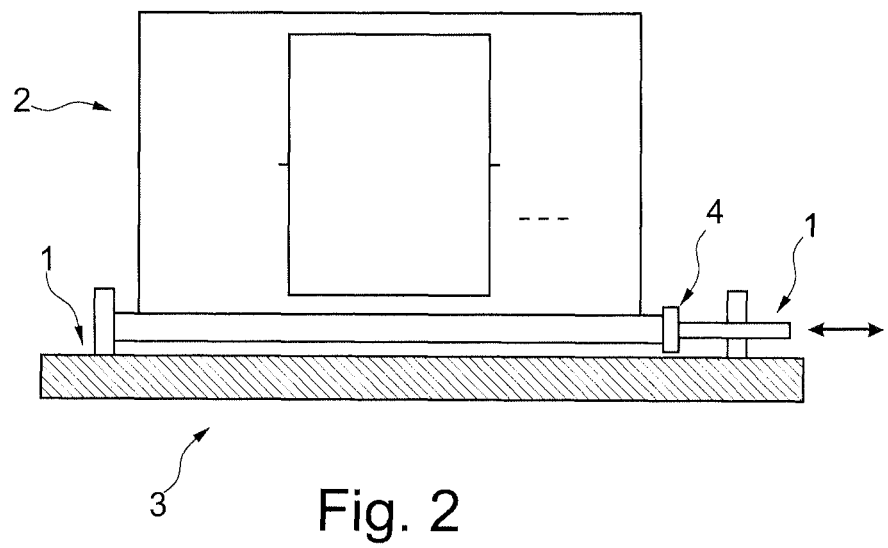
FIG. 2 shows a diagrammatic view of an exemplary embodiment of the present invention.

FIG. 2 shows an exemplary embodiment of the present invention. A locking device for fastening containers 2 for an aircraft is fastened by a locking arrangement 1 that can be affixed to an aircraft floor 3 by a retaining element 4. The at least one locking arrangement 1 can be attached to the aircraft floor 3 such that between the container 2 and the at least one locking arrangement 1 a gap 13 is provided for adjusting the container 2. Subsequently the retaining element 4 of the locking device can be moved in the direction of the payload 2 such that a gap 13 between the locking arrangement 1 and the payload 2 can be adjusted.

FIG. 1 shows a locking device as known from the state of the art. A payload 2' is stowed in a container 2 so that during movements or flight manoeuvres of the aircraft relative movements between the container 2 or the aircraft floor 3 arise. The container 2 is fastened to the aircraft floor 3 by a locking device 1. Despite the dynamic loading cases as a result of flight manoeuvres, i.e. during strong acceleration or deceleration of the aircraft, for practical reasons a gap 13 is left so that it is easier to load and unload the containers 2. The locking devices are therefore designed to be sufficiently strong so as not to break or fail if dynamic shock loads are experienced. This results in locking devices which require a considerable amount of space and which are heavy.

In FIG. 2 by the locking device according to the invention the gap 13 is closed or reduced so that the dynamic load factors are significantly reduced. More light-weight and smaller constructions are therefore imaginable.

Figure 3:
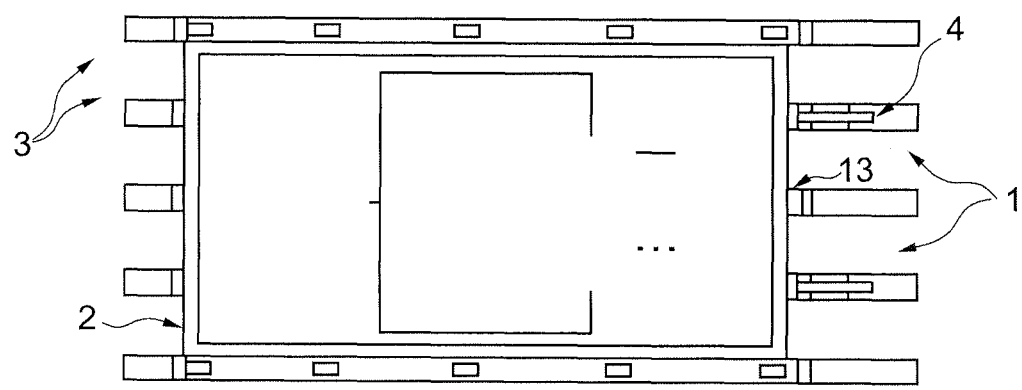
FIG. 3 shows a diagrammatic view according to an exemplary embodiment of the present invention.

FIG. 3 shows a top view of the locking system according to the invention. At least on one side facing the container 2 the locking device according to the invention is affixed so that there is a gap 13 in the direction of the container 2. After adjustment of the container 2, the gap 13 can be closed by the retaining element 4.

Figure 4:
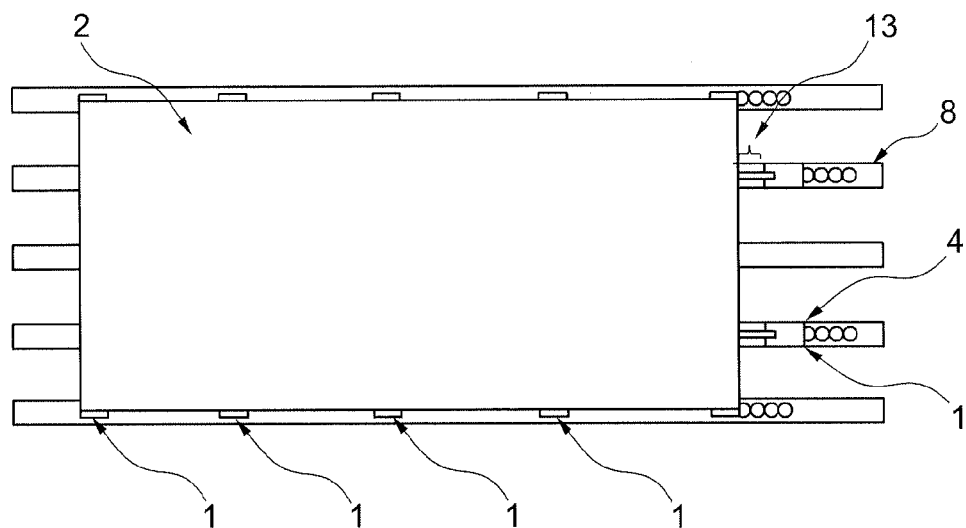
FIG. 4 shows a diagrammatic view of the present invention.

In FIG. 4 the container is held on fastening rails 5. By the adjustment holes 8 of the fastening rails 5 the locking device can be flexibly connected to the aircraft structure. The containers 2 can thus initially be placed and adjusted in a particular region and subsequently fastened by way of the retaining element 4. The flow of force passes into the aircraft structure 3 by way of the locking device and the fastening rail 5.

Figure 5:
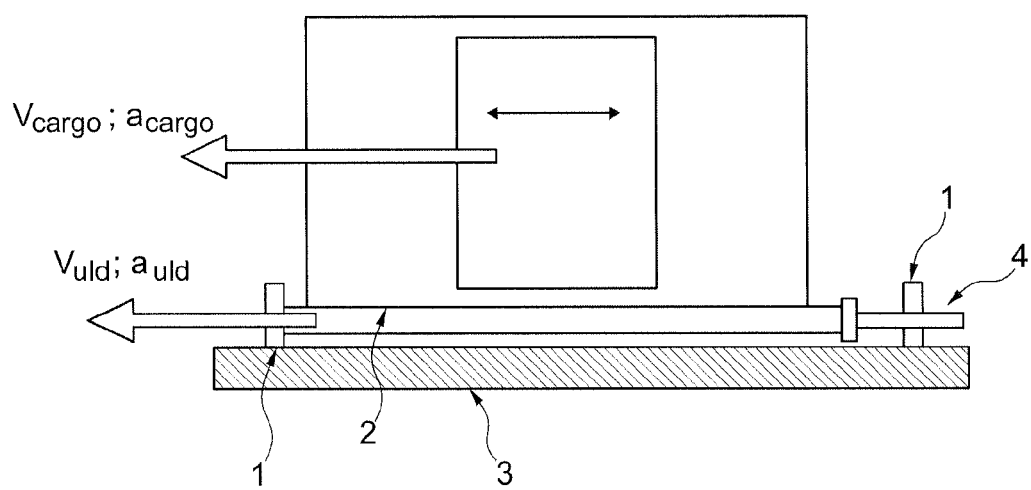
FIG. 5 shows a diagrammatic view of the present invention, showing the forces that occur between the load and the container.

FIG. 5 shows a diagrammatic view of the locking device according to the invention, in which the dynamic forces that are experienced are indicated. In this arrangement the payload 2' is held in the container 2 and has a certain velocity $v_{cargo}$ at an acceleration $a_{cargo}$. However, test procedures have shown that the dynamic forces resulting from this are negligible. The dynamic loads that occur as a result of the velocity $v_{ULD}$ and the acceleration $a_{ULD}$ result, however, in some of the dynamic loads experienced during flight manoeuvres being significantly higher than the static loads. The extent of these loading cases is determined predominantly by the extent of the impact velocity $v_{ULD}$ and of the empty weight of the container 2. As far as the impact velocity $v_{ULD}$ is concerned, the length of the gap 13 and the acceleration $a_{ULD}$ to which the container 2 is subjected as a result of flight movements are the determining factors. Due to the normally loose placement of the container 2, during flight manoeuvres or other forms of movement of an aircraft, relative movements occur, which result in very considerable dynamic loads. As shown in FIG. 5, due to there not being a gap 13, the majority of instances of dynamic loads that would otherwise be experienced do not occur. In this system according to the invention it becomes clear that it is only the relative movement between the payload 2' and the container 2 that generates dynamic forces.

Figure 6:
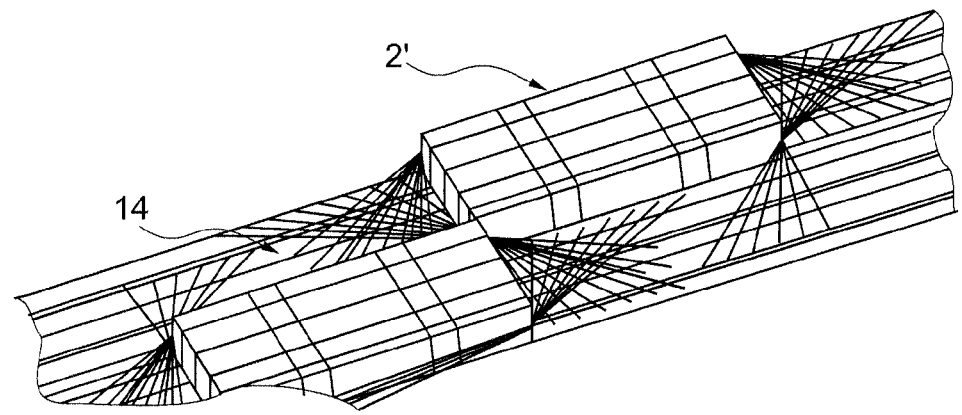
FIG. 6 shows a conventional fastening method, as known from the state of the art.

Due to the reduction in the dynamic forces with the use of the present invention, furthermore it is possible to not only hold the commonly used 20-tonne ULDs, but also to better fasten the so-called heavy pallets which can weigh up to 65 tonnes. Up to now the international aviation authorities only allow the placement of heavy pallets with the use of a complex fastening method, as shown in FIG. 6. This conventional fastening method has hitherto not been used for fastening heavy pallets weighing up to 65 tonnes, primarily because conventional fastening means cannot hold the dynamic loads that are experienced. These heavy pallets 14 therefore have to be braced using rope lines that have to extend into all the lines of application of force. Often only an ineffective arrangement of the containers 14 is possible, because it is for example impossible to fasten two containers 14 side by side because of the regulation of bracing each container individually. By storing heavy pallets 14 using the locking device according to the invention, heavy pallets 14 can be placed considerably more efficiently in cargo holds.

Figure 7:
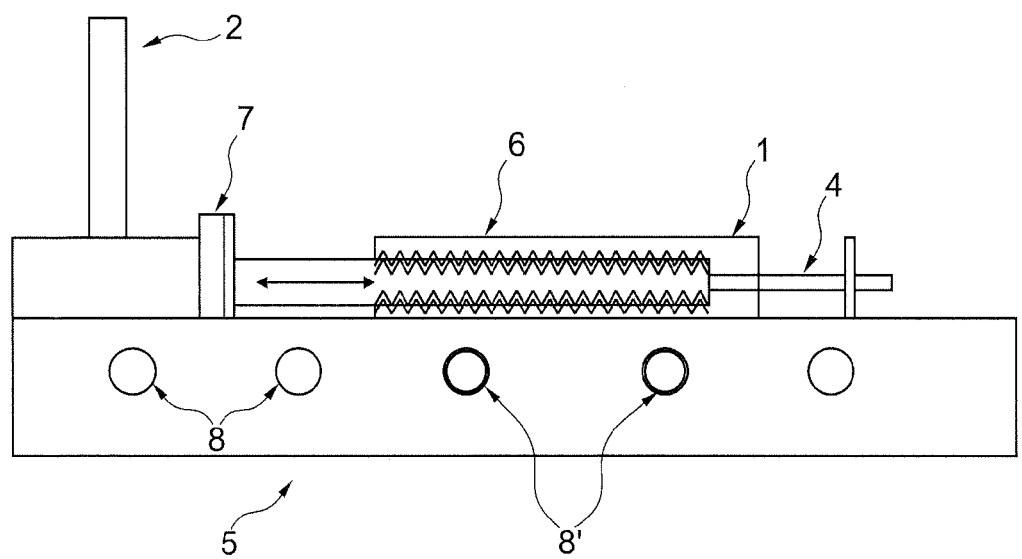
FIG. 7 shows a diagrammatic view of an exemplary embodiment of the retaining element and of the locking arrangement.

FIG. 7 shows an exemplary embodiment of the retaining element 4 of the locking unit 1 as well as of the damping element 7. Initially the container 2 can be placed in a particular region by the locking element 1 in that the locking unit 1 can be adjusted on the fastening rail 5 variably with the fastening holes 8. The gap 13 that still exists is used to align the container 2. Subsequently, by way of the threaded rod 6 of the retaining element 4, the gap 13 can be reduced. In order to compensate for unevenness, or for damping remaining dynamic forces, a damping element 7 can be attached between the retaining element 4 and the container 2 in order to further enhance the reduction in dynamic loads.

Figure 8:
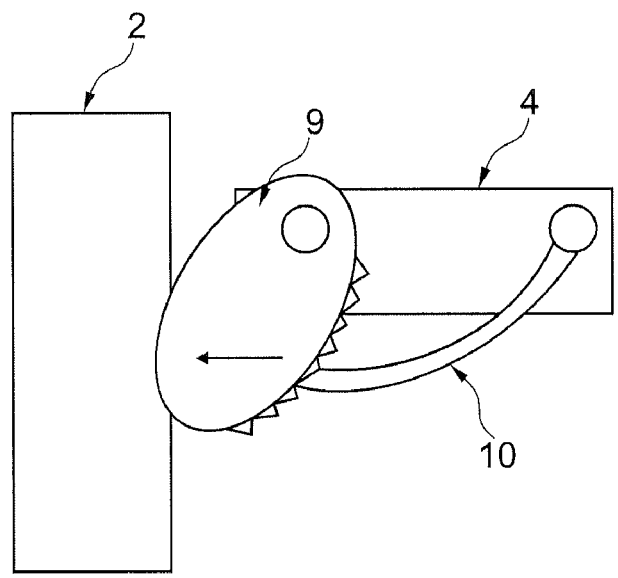
FIG. 8 shows a diagrammatic view of an embodiment comprising an eccentric detent element with engaging teeth.

FIG. 8 shows an exemplary embodiment of an eccentrically held retaining element 4. On the retaining element 4 a detent element 9 is affixed, which for example comprises engaging teeth on its surfaces. This detent element 9 can be used for reducing the gap 13 and can subsequently be affixed in the desired position by an engaging lever 10. In this way a simple system for fastening the container 2 is provided.

Figure 9:
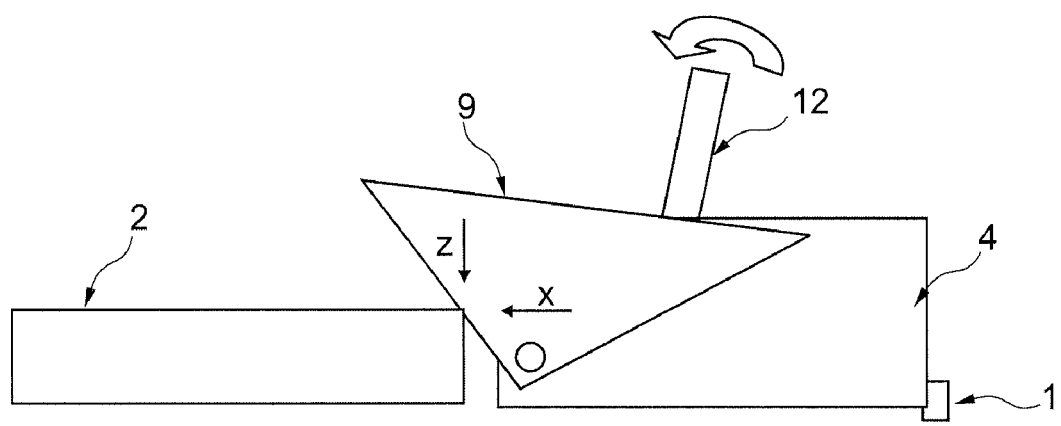
FIG. 9 shows a diagrammatic view of an eccentric detent element that can be operated by way of a foot lever.

FIG. 9 shows a further exemplary embodiment of the retaining element 4 with an eccentrically held detent element 9. In this arrangement a foot lever 12 is affixed such that simple operation or locking into place of the container 2 is possible. Thus an employee can for example manually align the container to a desired position and at the same time by operating the foot lever 12 of the detent element 9 can hold and lock into place the aligned position of the container 2.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics or steps of other exemplary embodiments described above. Reference characters in the claims are not to be interpreted as limitations.

The invention claimed is:

1. A locking device for fastening a container in an aircraft, the locking device comprising:
   at least one locking arrangement comprising a retaining element;
   wherein the at least one locking arrangement is attachable to an aircraft floor such that a gap for adjusting the container is provided between the container and the at least one locking arrangement;
   wherein the retaining element of the at least one locking arrangement is adapted for moving in the direction of the container such that the gap between the at least one locking arrangement and the container is adjustable;
   wherein the retaining element comprises an eccentric detent element with engaging teeth and an engaging element; and
   wherein the detent element is adapted to be inserted in the gap, and the position of the detent element is adapted to be locked into place in that the engaging teeth of the detent element engage the engaging element.

2. The locking device of claim 1, wherein the retaining element comprises a threaded rod for adjusting the gap.

3. The locking device of claim 1, wherein the engaging element comprises a foot lever for locking the detent element into place.

4. The locking device of claim 1, further comprising a fastening rail with adjustment holes, which fastening rail is affixed to the aircraft floor; and
   wherein the at least one locking arrangement is adapted to be adjustably affixed in a defined position along the fastening rail to provide the gap between the container and the at least one locking arrangement.

5. The locking device of claim 1, further comprising at least one damping element affixed between the retaining element and the container to dampen movements of the container.

6. The locking device of claim 1, further comprising an inspection element;
   wherein the inspection element is designed such that in the case of a malfunction of the at least one locking device an indication signal is generated.

7. The locking device of claim 1, wherein the at least one locking arrangement is a plurality of locking arrangements with retaining elements;

wherein the plurality of locking arrangements enclose the container in such a way that the gap for adjusting the container is provided; and wherein the retaining elements of the plurality of locking arrangements are adapted for moving in the direction of the container such that the gap between the plurality of locking arrangements and the container is adjustable.

8. A method for fastening a container in an aircraft, comprising:

affixing at least one locking arrangement with a retaining element to an aircraft floor;

wherein the at least one locking arrangement is fastened to the aircraft floor such that a gap for adjusting the container is provided between the container and the at least one locking arrangement;

wherein the retaining element of the at least one locking arrangement moves in the direction of the container such that the gap between the at least one locking arrangement and the container is adjustable;

inserting the retaining element into the gap with an eccentric detent element with engaging teeth; and fixing the position of the detent element in the gap by engagement of an engaging element with the engaging teeth.

9. The method of claim 8, further comprising:

damping a movement of the container by a damping element attached between the retaining element and the container.

10. The method of claim 8, further comprising:

monitoring the at least one locking arrangement by an inspection element with electrical sensors; and generating an indication signal in the case of malfunction of a locking device.

11. The method of claim 8, wherein the at least one locking arrangement is a plurality of locking arrangements with retaining elements, further comprising:

locking in the container by the plurality of locking arrangements with retaining elements in such a way that the gap for adjusting the container is provided between the plurality of locking arrangements and the container; and setting the gap between the plurality of locking arrangements and the container by the retaining elements that are adapted for moving in the direction of the container.

12. An aircraft comprising a locking device for fastening a container, the locking device comprising:

at least one locking arrangement comprising a retaining element;

wherein the at least one locking arrangement is attachable to an aircraft floor such that a gap for adjusting the container is provided between the container and the at least one locking arrangement;

wherein the retaining element of the at least one locking arrangement is adapted for moving in the direction of the container such that the gap between the at least one locking arrangement and the container is adjustable;

wherein the retaining element comprises an eccentric detent element with engaging teeth and an engaging element; and wherein the detent element is adapted to be inserted in the gap, and the position of the detent element is adapted to be locked into place in that the engaging teeth of the detent element engage the engaging element.

* * * * *